United States Patent
Wells et al.

(10) Patent No.: US 7,160,457 B2
(45) Date of Patent: Jan. 9, 2007

(54) DIGESTER COVER

(75) Inventors: William J. Wells, Greenville, SC (US); Mark D. Wilson, Greenville, SC (US)

(73) Assignee: Black & Veatch Holding Corp., Kansas City, MO (US)

( * ) Notice: Subject to any disclaimer, the term of this patent is extended or adjusted under 35 U.S.C. 154(b) by 216 days.

(21) Appl. No.: 10/960,398

(22) Filed: Oct. 7, 2004

(65) Prior Publication Data
US 2006/0076291 A1   Apr. 13, 2006

(51) Int. Cl.
C02F 3/28      (2006.01)
C02F 11/04   (2006.01)

(52) U.S. Cl. ................................ 210/603; 210/259
(58) Field of Classification Search ............... 210/603, 210/608, 252, 259, 538
See application file for complete search history.

(56) References Cited

U.S. PATENT DOCUMENTS

| | | | |
|---|---|---|---|
| 3,279,606 A | 10/1966 | Cox | |
| 3,980,199 A | 9/1976 | Kays | |
| 4,392,954 A * | 7/1983 | Bertschinger et al. | ... 210/195.3 |
| 4,413,747 A | 11/1983 | Tenold et al. | |
| 4,438,863 A | 3/1984 | Wilson et al. | |
| 4,648,968 A | 3/1987 | Cutler | |
| 4,710,292 A | 12/1987 | DeVos | |
| 5,453,179 A | 9/1995 | Stultz | |
| 5,641,401 A * | 6/1997 | Stultz et al. | ................ 210/218 |
| 5,942,116 A * | 8/1999 | Clark et al. | ................ 210/603 |
| 6,036,862 A * | 3/2000 | Stover | ........................ 210/603 |
| 6,216,881 B1 | 4/2001 | Schaller | |
| 6,372,131 B1 | 4/2002 | Mirowsky et al. | |
| 6,660,164 B1 * | 12/2003 | Stover | ........................ 210/612 |
| 2003/0057152 A1 * | 3/2003 | Haridas | ...................... 210/603 |
| 2003/0080054 A1 * | 5/2003 | Chuang et al. | ............. 210/616 |
| 2004/0084366 A1 * | 5/2004 | Anderson et al. | ........... 210/603 |

OTHER PUBLICATIONS

Plans for Hyperion Solids Handling (HSH) Digester Expansion (W.O. EXX31522) Digester Facilities, Date: 1992.
Plans for City of Mesa, Arizona Northwest Water Reclamation, date unknown.

* cited by examiner

Primary Examiner—Fred G. Prince
(74) Attorney, Agent, or Firm—John C. McMahon

(57) ABSTRACT

An anaerobic digester for use in wastewater treatment systems having a fixed cover including a central tower for controlling gas and foam. A constant operating level is maintained in the digester by utilization of an overflow weir located in the tower. The fixed cover having an under flat surface that is in direct contact with contents of the digester. The tower has a number of spray nozzles that operably direct movement of foam toward discharge locations.

15 Claims, 3 Drawing Sheets

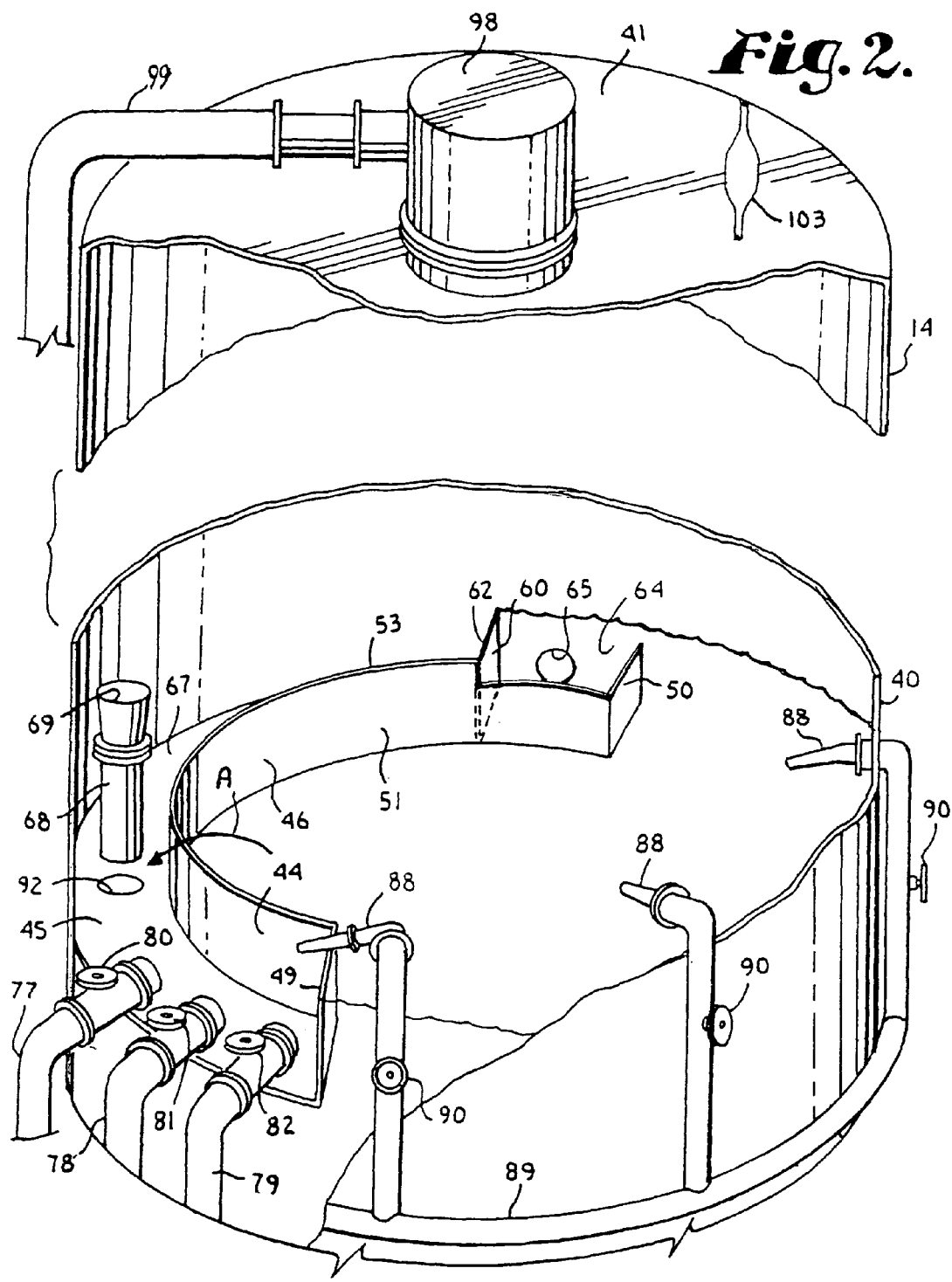

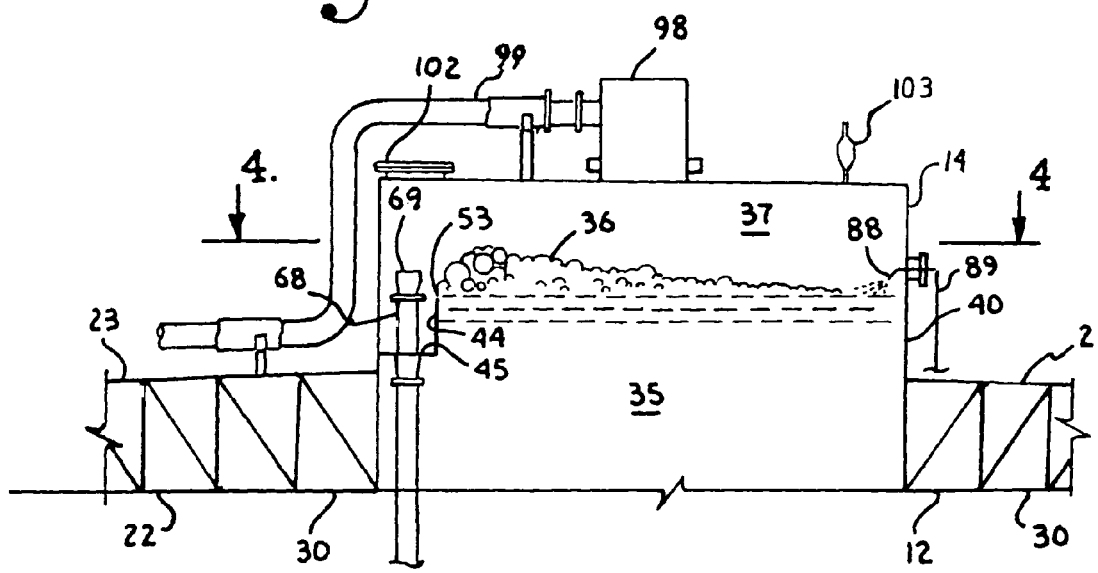
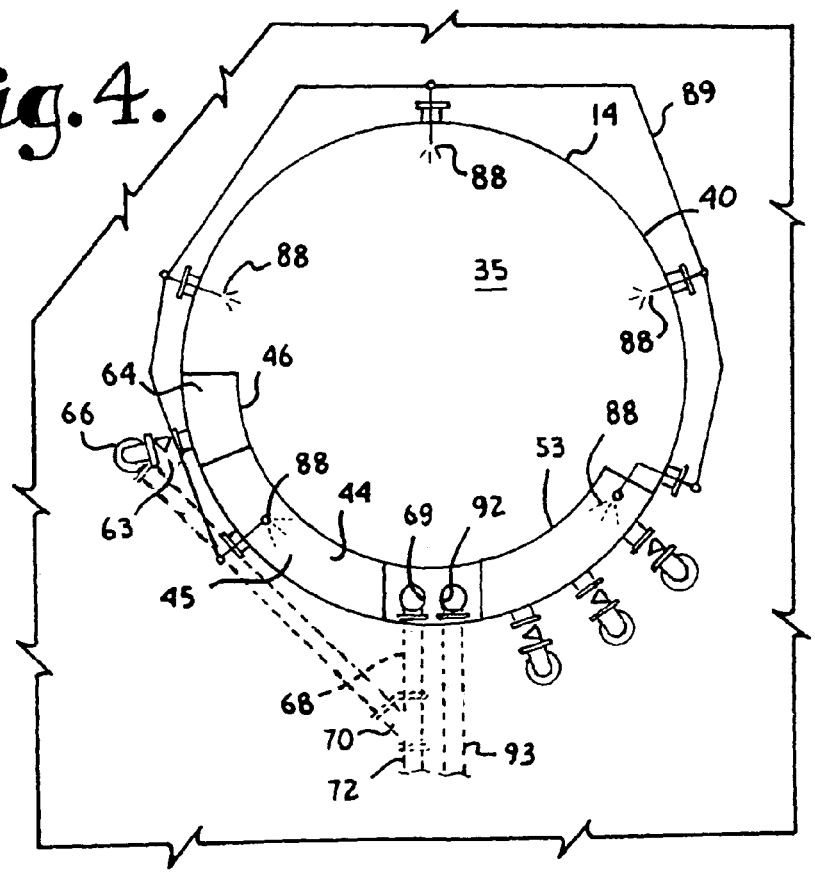

DIGESTER COVER

BACKGROUND OF THE INVENTION

The present invention is directed to methods and facilities for stabilizing and reducing solids content of excess activated sludge, foam, scum and the like that results from a biological wastewater treatment process or the like. More specifically, the invention is directed to a constant level anaerobic digester adapted to provide better handling of foam and gas by directing same into a central tower or elevated region that is equipped with gas venting and a weir overflow system to control sludge at a fixed level in the digester and in contact with most of the roof of the digester, while also providing piping and nozzle structure to control foam.

A functioning society produces an enormous amount of raw liquid sewage in the form of wastewater, which must be rendered innocuous prior to release into the environment. While some of this wastewater is treated chemically, the vast majority is treated using microorganisms that form a biomass that essentially eats, modifies or removes contaminants such as organic material, phosphorus and nitrates. Such processes especially convert organic materials into water, carbon dioxide and/or methane depending on the particular process being used. Such processes produce an excess of biomass or activated sludge because the microorganisms grow and multiply as they eat. Furthermore, stages of waste water treatment systems, such as primary clarifiers may produce scum which are removed from the clarified water. In most processes of this type, the excess activated sludge and scum are collected and must be treated in some manner. At some locations, these undesirable products may be sterilized, dried and used as fertilizer or transported to a landfill. Usually such processes are expensive and may result in substantial environmental problems and complaints from persons living in close proximity to the facility. Such process may also violate local or federal sludge disposal laws or guidelines.

Therefore, in some instances it is highly desirable to reduce the solids in the collected side streams by converting a portion of the solids to other substances such as gas that can be collected and beneficially used, especially methane gas, or that can be released, such as carbon dioxide. Such a process reduces the solids in the discharge components that must be later treated. A preferred system for such solids reduction is an anaerobic digester which utilizes microorganisms that live under anaerobic conditions and which modify much of the non-biomass organic material that remains in any side stream separated from the water treatment process and effectively eats or modifies other microorganisms in the sludge. Therefore, the streams are collected and placed into an anaerobic digester for stabilization and solids reduction. In such an anaerobic digester, the sludge is mixed and heated to maintain optimum conditions for certain organisms in the biomass to utilize other portions of the sludge as food so that the eaten organic material is stabilized.

The digestion process yields a number of by-products including methane gas released by biological activity of the organisms. Further, the mixing of the sludge along with the activity of the organisms has the potential to produce foam and scum, which rise to the surface of the digester contents creating a foam and scum layer. In many installations, scum from other areas of a facility may also be added to the contents of the digester. While some of the added scum is absorbed by the other contents or reduced in quantity by the microorganisms, some is not, thereby adding to the light material rising to the top of the digester. Controlling and removing the gas, especially methane gas, along with the scum and foam layer is essential in the proper operation of the digester. It is beneficial for the methane gas to be captured to prevent release into the environment and for preserving the methane to be used as a heat-producing gas at the facility. Therefore, the methane gas is collected from the top of the digester.

Most digesters of this type are relatively large and it is difficult to control the foam layer over a large surface. The collection of gas and foam can produce significant problems. In particular, the gas is normally withdrawn from digesters through ducting by downstream compression, which draws the methane and other gases out of the digester head space. If the foam gets out of control at the top of the digester, it can rise to the level of the gas take off and be drawn into the gas compressor system. Since such compressors are not designed for liquids or solids, foam drawn into such a compressor can seriously damage or destroy the machine. Therefore, it is desirable to control the foam layer by maintaining the top of the foam layer well below the gas take off during normal operation and by providing additional foam control apparatuses and methods of operation to control the foam layer, when needed.

Anaerobic digesters have long been employed for wastewater treatment processes. Designs for conventional shape digesters employ either fixed or floating dome covers that do not come into contact with the liquid. Fixed cover systems effectively control foam from escaping from the vessel; however, they do not limit foam generation within the vessel. Floating covers, typically used to provide gas storage within the vessel, also do not limit foam generation but have an added disadvantage of allowing foam to escape the vessel at the perimeter edge seals. Such covers are less effective in deterring foam formation, and do not promote re-entrainment of foam into the sludge to promote digestion while collecting methane gas in the uppermost part of the cover via a gas collection system. Such collection systems can lead to entrainment of foam into gas collection lines that are intended to capture only gas, thus potentially damaging compressors or other equipment.

Other prior art teaches an egg shaped vessel with a central dome that was developed to promote full mixing of the contents. However, such designs are relatively expensive and the design itself does not effectively resolve the problems of handling foam and collecting gas without foam getting into gas lines.

SUMMARY OF THE INVENTION

The present invention overcomes the problems previously described by providing a conventionally shaped anaerobic digester for processing sludge wherein the digester has a cover that is stationary and in direct contact with the contents contained within the digester over a large majority of an upper surface of the contents. The cover includes a slightly-sloped surface to provide a natural biased flow toward a central tower that extends above the contents of the digester for collection of gas, discharge of sludge and control of scum and foam. Sludge is maintained at a constant level in the digester and in contact with the entire under surface of the cover. Sludge is continuously fed into the digester and overflows a first sludge level control weir in the tower into a discharge with some entrained foam. A second weir is provided with a collection pan and drain which can be selectively flushed to help dispose of a scum and foam layer, when excess scum and foam collects. A set or series of spray nozzles is provided to direct and control foam located within the tower. In particular, water spray nozzles are provided which can be selectively utilized to direct the foam in the tower over the discharge weir. A gas collection dome located at the top of the tower collects the gas that naturally rises to the top of the tower. The gas is withdrawn through piping joined to the dome at a level above the sludge overflow weir and above the foam layer. In this manner, foam is minimized and separated from the gas thereby minimizing the likelihood that foam will get into gas lines and cause damage to the compressor or other downstream equipment.

OBJECTS AND ADVANTAGES OF THE INVENTION

The principal objects of the present invention include: providing an anaerobic digester with a cover that is in direct contact with the fluid contents of the digester over substantially all of the under surface of the cover leaving only a small area of the upper surface that is not in direct contact with the cover and having a central tower for collecting and controlling foam and gas produced in the digester; providing such a digester with an expansive cover and relatively small central dome area for directing foam and gas to a relatively smaller collection area wherein the foam can be effectively controlled; providing such a digester having a constant level; providing such a digester having a relatively universal and unrestrictive design that accommodates or can be applied in numerous applications; providing such a digester which can direct scum and foam via spray nozzles to a foam collection area in the tower to direct and control the collected scum and foam; providing such a digester having such a central tower to control scum and foam and gas and provide other benefits; to provide such a digester utilizing a weir located in the tower to control the level of sludge in the digester; to provide such a digester having a collection pan with a controllable drain to allow removal of excess scum and foam from the tower; to provide such a digester wherein the pan and drain act in consort with the spray nozzles which are selectively controllable by an operator to urge excess foam toward the pan and drain such that the foam is controlled or exits the digester tower without being entrained in gas exiting the digester tower; providing such a digester having a method for capturing, collecting and separating foam and gas; providing such a digester that maintains a generally constant sludge level therein while continuously flowing sludge into and out of the digester; providing such a digester having a collection area for the purpose of diverting foam away from the gas collection area to prevent foam from being entrained in gas lines; providing such a digester having such a cover that directly engages sludge throughout the upper surface of the digester contents except in the tower for the purpose of limiting open area that may collect foam in the top of the digester; providing a method of operating such a digester utilizing a level control weir located within the top portion of the digester to control contents level; providing a method of operating such a digester utilizing a flush option so that an operator can selectively dispose of excess accumulated scum and foam quickly, if needed; and providing such a digester and associated methods which are relatively easy to use, inexpensive to produce and particularly well-suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged, fragmentary and partially exploded perspective view of the anaerobic digester cover central tower that is shown in FIG. 1 with portions broken away to illustrate detail thereof.

FIG. 3 is an enlarged and fragmentary side elevational view of the central tower of FIG. 2 with portions broken away to illustrate detail.

FIG. 4 is an enlarged and fragmentary cross-sectional view of the central tower, taken along 4—4 of FIG. 3.

DETAILED DESCRIPTION OF THE INVENTION

Figure 1:
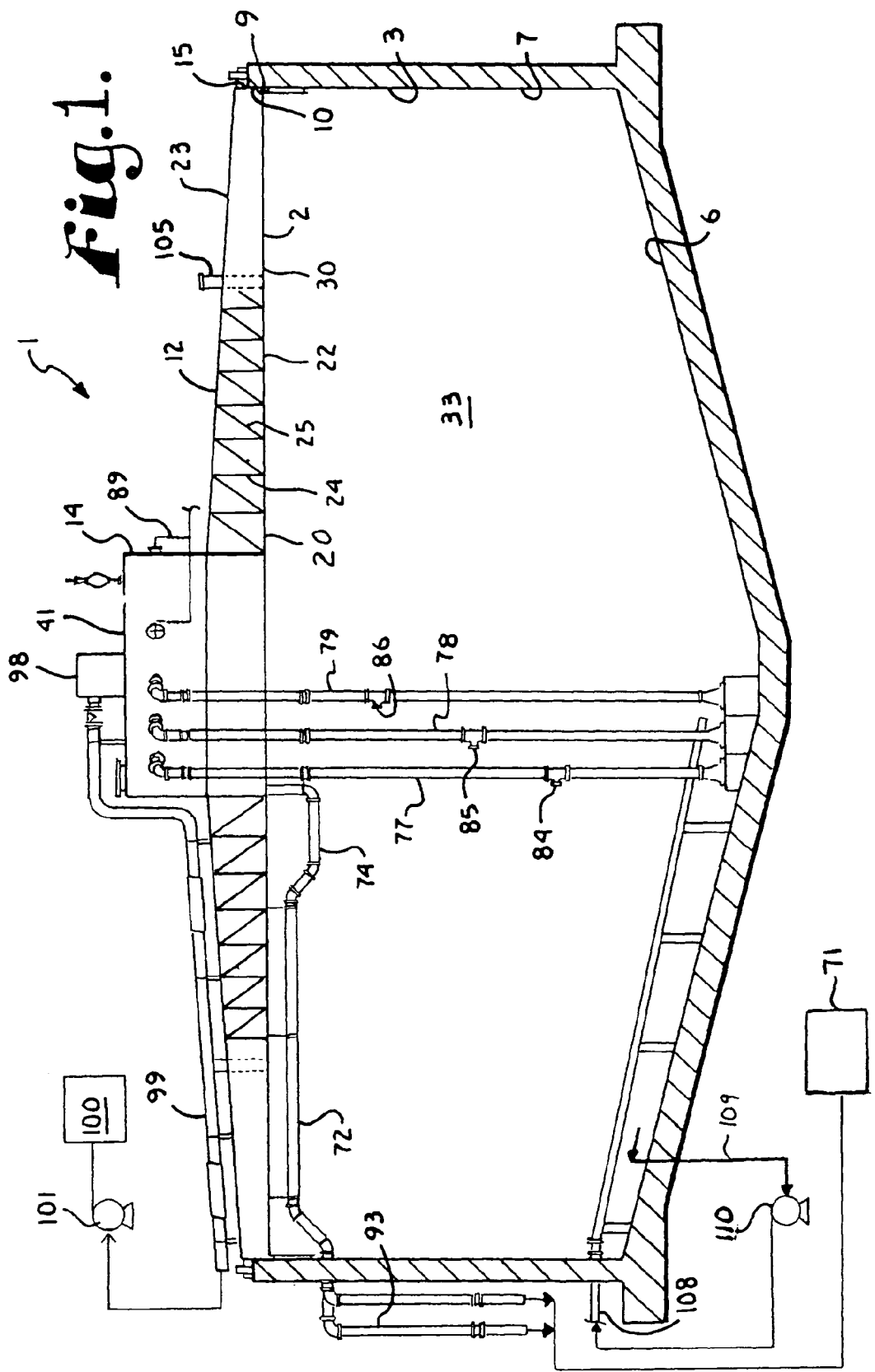
FIG. 1 is a partially schematic and cross-sectional view of an anaerobic digester in accordance with the invention having a cover with a central tower.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally identifies an anaerobic digester in accordance with the present invention for use in conjunction with one or more sludge producing facilities such as waste water treatment plants which may be located in close proximity to or remote from the digester 1. The digester 1 has a non-moveable or fixed-position digester cover 2 and a digester tank, reservoir or basin 3. The digester 1 is designed to maintain a constant contents level under normal operating conditions.

The illustrated basin 3 has a sloped bottom 6 and a cylindrical, upright sidewall 7 that forms a liquid containing enclosure suitable for receiving sludge for processing. A preferred material of construction for the basin 3 is concrete. The basin 3 has a relatively large opening 9 at an upper end 10 thereof that is enclosed by the cover 2. The basin 3 is normally formed partially buried in ground. The opening 9 at the basin upper end 10 can vary in size according to the size requirements of the digester 1, but is comparatively wide often having a diameter that is substantially greater than the height of the basin 3. For example, a digester of the type illustrated may have a basin opening 9 with a diameter of 65 feet with a sidewall height of 30 feet.

The fixed cover 2 extends over or spans the entire basin upper end 10 and can be sized and shaped to be used with basins of varying shapes and sizes. The cover 2 has a liquid engaging portion 12 and a central tower 14, as best shown in FIG. 1. The cover 2 is attached and sealed about a periphery 15 thereof to the basin top end 10 so as to form a liquid and gas tight containment. The cover 2 is fixed in position relative to the basin 3 and is of a rigid design so as not to move substantially during operation. The liquid engaging portion 12 includes spans 20 that extend from the side 7 radially to the tower 14. The spans 20 have lower beams 22, upper beams 23, struts 24 and cross braces 25 which are assembled to provide a strong fixed position and generally rigid roof across the basin 3. The underside of the cover 2 is constructed with an impermeable and continuous liquid and gas containing surface 30 to prevent gas and/or liquid from escaping except directly beneath the tower 14. The underside surface 30 is joined to the basin wall 7 around a periphery of the cover 2. A junction between the cover 2 and basin wall 7 is liquid and gas tight.

Although the cover described in the illustrated embodiment is of such a design as to be constructed of principally metal components, it is foreseen that in accordance with the invention that the cover could be constructed of other materials. In particular, it is foreseen that the cover could be of concrete construction and formed with or joined with the walls of the basin.

The illustrated tower 14 is centrally located and this location is preferred; however, the tower 14 may be asymmetrically located in some installations. The surface 30 in conjunction with the basin 3 urges lighter components of digester 1 contents to remain in a liquid phase 33 for digestion or to provide a naturally-biased flow of excess and lighter components toward the tower 14. The surface 30 may be substantially horizontal or slightly sloped toward the tower 14 to urge gas toward the tower 14. With references to FIG. 3, the tower 14 is disposed or located substantially or mainly above the surface 30 and receives excess liquid sludge 35, light components 36 (including foam scum and the like) and gas 37. The illustrated tower 14 is generally cylindrical in shape; however, other shapes are foreseen to be useable in accordance with the invention. The tower 14 has a horizontal cross-section that is substantially smaller than the area of the cover lower surface 30.

In the illustrated embodiment, the tower has a horizontal diameter of about 13.5 feet and a height of about 8 feet. The tower 14 has an cylindrical upright sidewall 40 and a flat top 41 forming a liquid and gas containment except as noted below where penetrated by piping or the like.

Located along and joined to the tower side wall 40 is a pan or trough 44 which is best seen in FIG. 2. The trough 44 has a bottom wall 45 and a trough side wall 46 that has end segments 49 and 50 and a curved outer segment 51 that is generally uniformly spaced from and follows the curvature of the tower side wall 40. A portion of the trough side wall 46 that corresponds to the trough 44 has an elongated upper edge 53 that is horizontal and operably functions as a first flow control and sludge level control weir. In the illustrated embodiment, the weir upper edge 53 is spaced about 3 feet from the tower top wall 41. The trough wall 46 of the illustrated embodiment is about 1.5 feet high.

Located at one end of the trough 44 and extending between the tower side wall 40 and the side wall 46 is an end wall 60 that has a height that is the same as the trough wall 46 and end segment 49. The end wall 60 has a horizontal upper edge 62.

The trough walls 50, 51 and 60 in conjunction with the tower wall 40 form a receptacle 64 which is flow connected through an opening 65 to a pipe 66. The upper edges of the walls 50 and part of 51 forming the receptacle 64 are approximately located twelve inches below the edge 53 of the remainder of the wall 51 that functions as the normal overflow weir. Flow into the pipe 66 is controlled by a valve 63 which is opened to especially remove scum or foam 36 collected in the tower 14.

The wall 60 wall segment 51 and wall 49 cooperative with the tower wall 40 to form a main sludge overflow collection receptacle 67 with sludge 35 normally overflowing the weir formed by the wall tops of the walls 46, 60 and 49, and especially the edge 53 so as to be collected in the receptacle 67 during normal operation. The arrow identified by the letter A indicates such flow.

The trough bottom wall 45 is penetrated by a stand pipe 68 that has an upper opening 69 that is located above the weir forming upper edge 53. The stand pipe 68 functions to provide emergency overflow in the situation where other overflow paths become blocked. The stand pipe 68 joins with the overflow pipe 66 at a junction 70 and there is joined to a discharge pipe 72. The discharge pipe 72 operably flow connects to a sludge storage facility 71 that can be a tank, multiple tanks or other structure suitable for storing sludge and receiving overflow of sludge from the discharge pipe 72 as well as special discharge of scum, foam and sludge through the pipe 66 by operation of the valve 63. A trap 74 is also provided in the discharge pipe 72.

As can be best seen in FIG. 2, a series of three gravity discharge pipes 77, 78 and 79 also open into the trough 44 and have respective valves 80, 81 and 82, as well as respective lower inlets 84, 85 and 86 that open into lower portions of the digester basin 3 (for example at 3, 10 and 16 feet below the tower 14). The discharge pipes 77, 78 and 79 may be selectively used to discharge sludge from lower levels of the digester 1 by bypassing the overflow weir 53 in the tower 14 by opening one or more of the valves 80, 81 or 82 respectively. The invert elevations of these lines at the connection to receptacle 67 is approximately six inches below the elevation of weir edge 53.

Located at spaced locations within the tower 14 are a series of spraying nozzles 88. Each of the nozzles 88 is joined to a water line 89 and the spray flow through each nozzle 88 is controlled by an independent valve 90.

The trough bottom wall 45 is also penetrated by an opening 92 of a second discharge pipe 93 that operably joins with the sludge storage facility 71. Under normal operating conditions, the excess sludge flow in the digester 1 which is approximately equal to the incoming sludge flow overflows the weir 53, enters the receptacle 67 and exits the digester 1 through the opening 92 so as to enter the pipe 93.

Penetrating the tower top wall 41 is a gas collection dome 98 that is flow joined to a gas discharge pipe 99. The gas discharge pipe 99 joins with a compressor 101 and collection facility schematically indicated by the box with the reference numeral 100. The compressor 101 draws gas from the dome 98.

An access manhole 102 also penetrates the tower top wall 41. A safety pressure-vacuum release valve 103 also is located on the tower 14 and communicates with the interior thereof.

A sample port 105 is provided in the cover 2. A recirculation suction line or pipe 109 is flow linked to a sludge recirculation pump 110 for recirculating sludge to a multiapertured discharge pipe 108 in the bottom of the digester 1. Normally, the basin 3 is maintained in the mesophilic range of from about 35° C. to 55° C. Mixing of the digester contents 33 can be by various conventional means and is preferably provided by gas driven eductor tube mixers (not shown).

In use, at least partly dewatered sludge containing high concentration of biomass or microorganisms, some other organic compounds and certain other components is transferred into the basin 3 and preferably maintained at an elevated temperature in the mesophilic range which is conducive to digestion of at least a portion of the sludge by certain of the microorganisms therein.

The digester 1 is filled with liquid sludge 33 from a source so that the sludge 33 contacts or engages the entire under surface 30 of the basin cover 2 which is fixed in position and which does not raise or lower substantially during operation of the digester 1. The sludge 33 continuously enters the tower 14 and overflows the weir formed by the trough front wall upper edge 53 and top edges of side walls 49 and 60. During normal operation, the sludge 33 thereafter flows into the trough 45. In particular, excess sludge in an amount approximately equal to the incoming sludge normally continuously exits the discharge pipe 93. If the discharge pipe 93 gets blocked or flow is too great, the sludge level 33 rises slightly and overflows into the standpipe 68.

When foam 36 collects in the tower 14 and is not satisfactorily entrained into the discharge pipe 93 with the sludge 33, water sprays can be selectively activated by an operator from nozzles 88 so as to drive the foam 36 toward the collection trough 67. If this still fails to remove sufficient foam 36, the valve 63 may be opened to encourage discharge therethrough of sludge 33 along with a flushing action with respect to the sludge 33, as the height of the receptacle 64 is below the normal level of the sludge 33 in the tower 14. This flushing can be accompanied with water spray from the nozzles 88.

Gas 37 (mostly methane) generated by the digester 1 collects in the top of the tower 14 and in the dome 98 from which the gas 37 is drawn through gas discharge pipe 99 by a compressor 101 and delivered to the storage facility 100. By effective use of spray and operation of discharge pipes 99, foam 36 can be separated from gas 37, so that the gas 37 can be withdrawn essentially free of entrained foam 36. The pipes 77, 78 and 79 can be used to gravity recycle sludge, as required by operation.

It is to be understood that while certain forms of the present invention have been illustrated and described herein, it is not to be limited to the specific forms or arrangement of parts described and shown.

What is claimed and desired to be secured by Letters Patent is as follows:

1. An anaerobic digester for use in treatment of sludge containing microorganisms; said digester comprising:
   a) a sludge receiving basin adapted to receive sludge therein;
   b) a cover positioned over said basin and having an under surface that is adapted to be in direct contact with respect to sludge contents within said digester;
   c) a tower mounted so as to extend above said cover and flow communicate with the contents in the digester;
   d) a weir positioned within the tower to provide sludge level control by allowing an overflow and discharge of sludge raising through said tower; and
   e) a gas dome located in said tower above said weir for collecting and discharging gas.

2. The digester according to claim 1 further including:
   a) a spray nozzle located in said tower and being adapted during operation to urge foam within said tower over said weir.

3. The digester according to claim 1 wherein:
   a) said tower has a lower horizontal cross-sectional area that is substantially smaller than a surface area associated with said cover under surface.

4. The digester according to claim 3 wherein:
   a) said under surface area is at least 10 times greater than said tower area.

5. The digester according to claim 1 including:
   a) an overflow collection trough located in said tower; and wherein:

b) said weir forms an upper edge of said trough; and
   c) said trough being flow connected to a sludge discharge pipe.

6. The digester according to claim 5 wherein:
   a) said weir is a first weir; and including
   b) a second weir located lower than said first weir and being joined by a flushing valve to a discharge system.

7. The digester according to claim 6 wherein:
   a) said discharge pipe is a first discharge pipe; and including
   b) a second discharge pipe flow connected through the valve to a floor of said trough downstream of said second weir.

8. The digester according to claim 1 wherein:
   a) said cover is rigid and fixedly secured to said basin.

9. The digester according to claim 1 wherein:
   a) said cover is substantially sized and shaped to cover all of said basin except in the region of said tower and said cover is sealably joined to said basin around a periphery thereof.

10. A digester for biologically treating sludge comprising:
    a) a basin adapted to receive sludge;
    b) a cover secured to said basin and having an under surface that is adapted to contact said sludge during operation; and
    c) a level control weir located above said cover under surface and adapted to allow overflow of sludge from said basin so as to maintain sludge in continuous contact with said cover under surface during normal operation.

11. A method of biologically treating sludge in a digester while controlling sludge level and separating foam from gas produced in the digester comprising the steps of:
    a) providing an anaerobic digester having a cover and a tower extending above said cover and flow communicating with said digester;
    b) flowing sludge into said digester and filing said digester such that said sludge contacts an under surface of said cover and rises in said tower;
    c) providing a level control weir in said tower such that sludge and foam overflows said weir so as to maintain a generally constant height of sludge relative to said digester during normal operation;
    d) providing a gas collection dome in said tower spaced above said weir; and
    e) collecting gas in said dome and discharging collected gas from said tower.

12. The method according to claim 11 including the steps of:
    a) providing spray nozzles in said tower; and
    b) utilizing said nozzles to spray fluid on said foam so as to direct said foam to discharge from said digester.

13. In a concentrated sludge digester having a basin and a cover, the improvement comprising:
    a) placing an overflow for sludge in said digester above an under surface of said cover such that sludge continuously contacts said cover under surface during normal operation.

14. In a sludge digester having an upper region wherein gas and foam collect, the improvement comprising:
    a) said digester including a tower extending above a cover of said digester and wherein said upper region is located within said tower; a fluid spray nozzle located in said upper region and being sized, shaped and positioned to operably spray fluid at foam in said tower so as to direct flow of foam within said upper region.

15. In a sludge digester having a basin with a cover, the improvement comprising:
 a) an overflow weir located at a desired sludge operating level so as to maintain a generally constant level of sludge in said digester;
 b) said cover includes a central tower that rises above an under surface of the cover of said basin; and wherein
 c) said weir is located in said tower.

* * * * *